United States Patent [19]

Eto

[11] Patent Number: 5,060,747
[45] Date of Patent: Oct. 29, 1991

[54] TORQUE SPLIT CONTROL SYSTEM FOR A FOUR WHEEL DRIVE VEHICLE

[75] Inventor: Yoshiyuki Eto, Isehara, Japan

[73] Assignee: Nissan Motor Co., Ltd., Yokohama, Japan

[21] Appl. No.: 502,684

[22] Filed: Apr. 2, 1990

[30] Foreign Application Priority Data

Apr. 19, 1989 [JP] Japan .................................. 1-99745

[51] Int. Cl.$^5$ ............................................ B60K 17/35
[52] U.S. Cl. .................................. 180/197; 180/249; 364/424.1
[58] Field of Search ........................ 180/233, 248, 249; 364/424.1

[56] References Cited

U.S. PATENT DOCUMENTS

| | | | |
|---|---|---|---|
| 4,558,414 | 12/1985 | Sakakiyama | 180/233 |
| 4,754,834 | 7/1988 | Ozaki et al. | 180/233 |
| 4,757,870 | 7/1988 | Torii et al. | 180/233 |
| 4,773,500 | 9/1988 | Naito et al. | 180/233 |
| 4,776,424 | 10/1988 | Naito | 180/233 |
| 4,825,368 | 4/1989 | Itoh et al. | 364/424.1 |
| 4,846,298 | 7/1989 | Naito | 180/233 |
| 4,874,056 | 10/1989 | Naito | 180/233 |
| 4,887,689 | 12/1989 | Naito | 180/233 |
| 4,961,476 | 10/1990 | Witte et al. | 180/197 |

FOREIGN PATENT DOCUMENTS

| | | | |
|---|---|---|---|
| 319830 | 6/1989 | European Pat. Off. | 180/233 |
| 0336055 | 10/1989 | European Pat. Off. | |
| 60431 | 3/1989 | Japan | 180/233 |

Primary Examiner—Kenneth R. Rice
Assistant Examiner—Kevin Hurley
Attorney, Agent, or Firm—Foley & Lardner

[57] ABSTRACT

A driving force distribution control system for a 4WD vehicle includes a torque distributing clutch for varying a driving force transmitted to secondary drive wheels such as front wheels in response to a control signal, one or more sensors for determining a vehicle speed, and a measured wheel speed difference between a sensed speed of primary drive wheels such as rear wheels and a sensed speed of the secondary drive wheels, and a controller for producing the control signal. The controller determines a correction quantity which increases as the vehicle speed increases, further determines a corrected wheel speed difference by subtracting the correction quantity from the measured wheel speed difference in order to eliminate an undesired influence of a tire diameter difference between the front and rear wheels, and produces the control signal in accordance with the corrected wheel speed difference.

17 Claims, 6 Drawing Sheets

TORQUE SPLIT CONTROL SYSTEM FOR A FOUR WHEEL DRIVE VEHICLE

BACKGROUND OF THE INVENTION

The present invention relates to a torque split control system for controlling a driving force distribution between front and rear wheels of a four wheel drive vehicle, and more specifically to a torque split control system which can control the driving force distribution adequately in accordance with a wheel speed difference between front and rear wheels without receiving undesired influences of a tire diameter difference between the front and rear wheels.

A conventional driving force distribution control system controls a driving force distribution between front and rear wheels by controlling an engagement force of a torque distributing transfer clutch in accordance with a wheel speed difference between front and rear wheel speeds detected by wheel speed sensors.

However, this conventional control system tends to increases the clutch engagement force excessively especially in a high vehicle speed range when the front and rear wheel tire diameters become different from each other. As shown in FIG. 7, the measured wheel speed difference DVw between the front and rear wheels is equal to a sum of a wheel speed difference DVs due to drive wheel slip, and a wheel speed difference DVt due to a difference between the front wheel tire diameter and the rear wheel tire diameter, and this conventional control system increases the clutch engagement force as shown by a line Tm' in FIG. 7, in accordance with the measured wheel speed difference DVw, without considering the wheel speed difference DVt due to the tire diameter difference. As a result, there arise undesired up-and-down vibrations and an excessive increase in differential oil temperature due to excessive heat generated by clutch slippage (=DVs+DVt).

The tire diameters of the front and rear wheels are more or less unequal because of difference in operating condition such as tire air pressure and wheel load, inequality in tire wear, intentional installation of tires of different sizes, or usage of a temporary spare tire.

SUMMARY OF THE INVENTION

It is an object of the present invention to provide a driving force distribution control system which can control the driving force distribution adequately in accordance with a wheel speed difference between the front and rear wheels without receiving undesired influences of tire diameter difference between the front and rear wheels.

According to the present invention, a driving force distribution control system for a vehicle comprises a torque distributing means, first and second sensing means, and first, second and third processing means.

The driving force distributing means comprises a primary drive means for transmitting a driving force from an engine of the vehicle to primary drive wheels such as rear wheels of the vehicle, and a secondary drive means for transmitting a driving force from the engine to secondary drive wheels such as front wheels of the vehicle through a torque distributing clutch capable of varying the driving force transmitted to the secondary drive wheels in response to a control signal.

The first sensing means determines a measured wheel speed difference between a primary wheel speed of the primary wheels and a secondary wheel speed of the secondary wheels. The second sensing means determines a vehicle speed of the vehicle.

The first processing means determines a correction quantity in accordance with the vehicle speed. The second processing means determines a corrected wheel speed difference which is a difference resulting from subtraction of the correction quantity from the measured wheel speed difference determined by the first sensing means. The third processing means determines a desired clutch engagement force in accordance with the corrected wheel speed difference, and produces the above-mentioned control signal representing the desired clutch engagement force.

To facilitate understanding of the claimed invention, FIG. 1 shows one example of the control system according to the invention. The control system of this example includes the primary drive means 102 for transmitting the driving force from the engine 101 to the primary drive wheels 103, the secondary drive means 104 for transmitting the driving force from the engine to the secondary drive wheels 105 through the torque distributing clutch 106, the first sensing means 107 for determining the measured wheel speed difference, the second sensing means 108 for determining the vehicle speed, the first processing means 109 for determining the correction quantity, the second processing means 110 for determining the corrected wheel speed difference, and the third processing means 111 for determining the desired clutch engagement force and producing the control signal. The control system may further include a third sensing means 112 for sensing a lateral acceleration of the vehicle, and a gain determining means 113 for determining a control gain as in the illustrated embodiment. The control system can also include a processing means 114 for determining the desired clutch engagement force and for producing the control signal when the measured wheel speed difference is negative.

DETAILED DESCRIPTION OF THE INVENTION

One embodiment of the present invention is shown in FIGS. 2-6.

Figure 1:
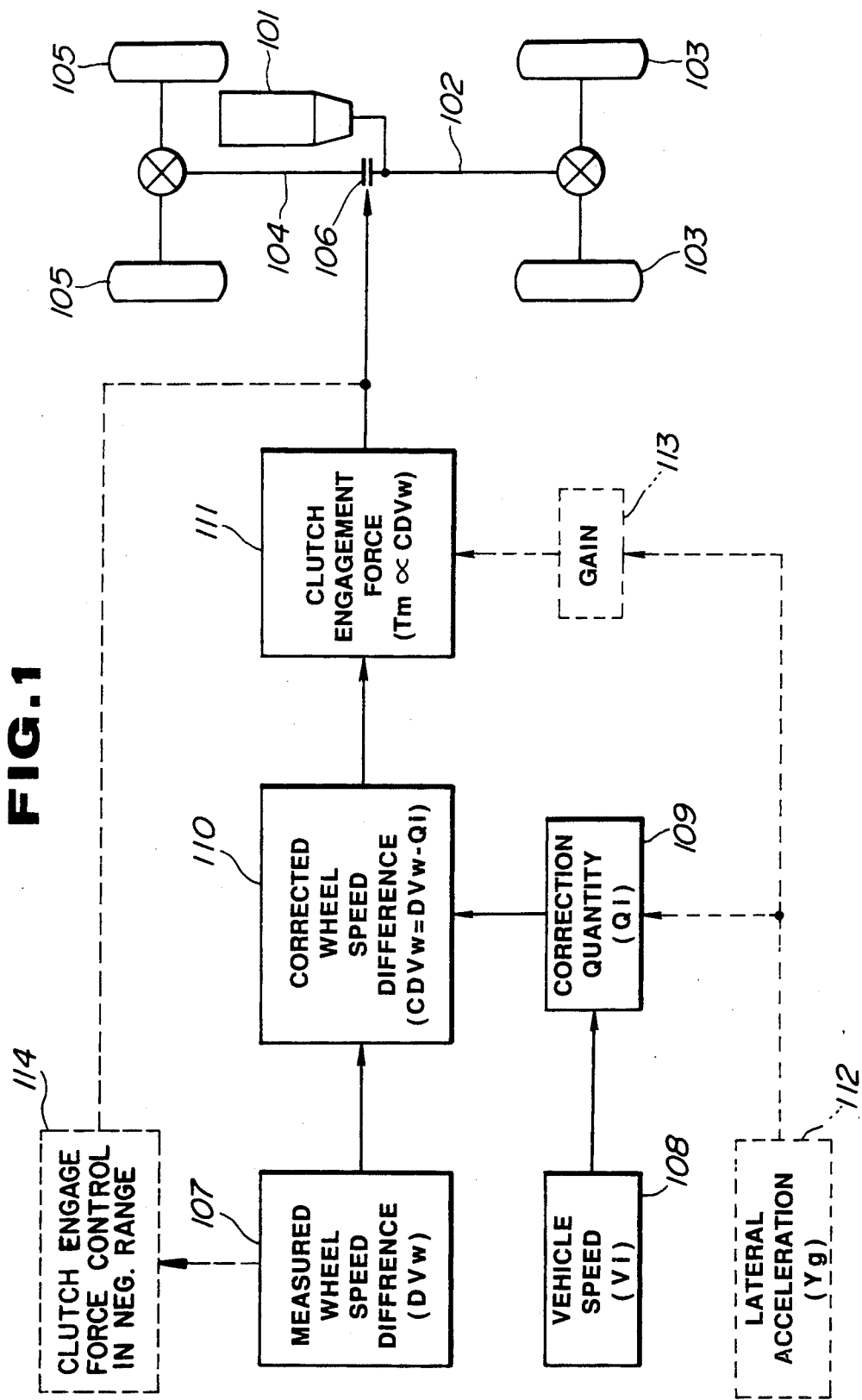
FIG. 1 is a schematic view for showing, as an example, a driving force distribution control system according to the claimed invention.
Figure 2:
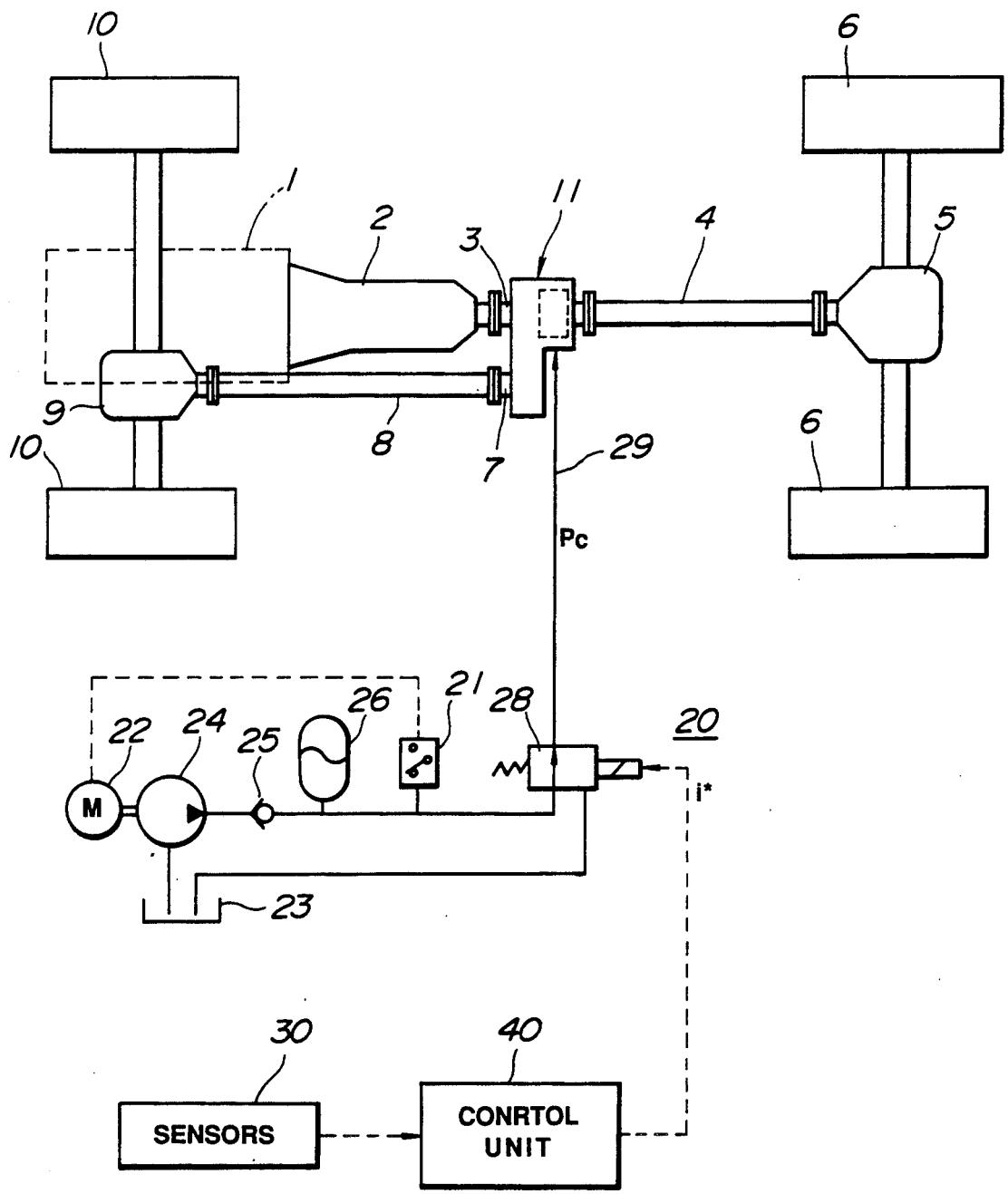
FIG. 2 is a schematic view of a 4WD vehicle equipped with a driving force distribution control system of one embodiment of the invention.

FIG. 2 shows a 4WD vehicle equipped with a torque split control system (driving force distribution control system).

The vehicle has a drive system which includes an engine 1, a transmission 2, a transfer input shaft 3, a rear propeller shaft 4, a rear differential 5, rear wheels 6, a transfer output shaft 7, a front propeller shaft 8, a front differential 9, front wheels 10, and a transfer 11. In this embodiment, this rear wheels 6 are primary drive wheels, and the front wheels 10 are secondary drive wheels. From the transmission 2, engine torque is transmitted to the rear wheels 6 through a rear drive line which serves as a primary drive means for transmitting engine torque directly to the primary drive wheels, and transmitted to the front wheels 10 through a front drive line which serves as a secondary drive means having a torque distribution clutch (or a transfer clutch). In this embodiment, the torque distribution clutch is a wet type multiple disc clutch provided in the transfer 11. Therefore, the engine torque is transmitted directly to the rear wheels 6. On the other hand, the engine torque is transmitted to the front wheels 10 through the torque distributing clutch which is capable of continuously varying the torque transmitted to the front wheels, and completely disconnecting the front wheels 10 from the engine 1. The transfer and its torque distributing clutch are illustrated and explained more in detail in commonly assigned U.S. Pat. Nos. 4,754,834; 4,757,870; 4,773,500; 4,776,424; 4,846,298; 4,874,056 and 4,887,689, and commonly assigned U.S. applications Ser. Nos. 07/254,875; 07/255,820; 07/277,377 and 07/255,939. The related explanations and figures of these patents are herein incorporated by reference.

The torque split (driving force distribution) control system further includes a hydraulic system 20 for producing a control oil pressure Pc supplied to the distributing clutch, a group of various sensors 30, and a torque split control unit 40. The control unit 40 produces a dither current i* in accordance with output signals of the sensors 30, and controls the clutch engagement force of the torque distribution clutch of the transfer 11 by sending the dither current to a solenoid valve 28 of the hydraulic system 20.

The hydraulic system 20 includes a relief switch 21, a motor 22, an oil reservoir tank 23, an oil pressure pump 24, a check valve 25, an accumulator 26, and the above-mentioned solenoid valve 28. The motor 22 is turned on and off by the relief switch 21, and drives the oil pump 24 which sucks the oil from the reservoir tank 23. The oil pressure discharged from the pump 24 (primary oil pressure) is supplied through the check valve 25, and stored in the accumulator 26. The solenoid valve 28 receives a line pressure (secondary pressure) from the accumulator 26, and produces the control oil pressure Pc in accordance with the dither current i* sent from the control unit 40. The control oil pressure Pc is supplied to the torque distributing clutch of the transfer 11 through an oil pipe 29. In this way, the control unit 40 can continuously vary the engagement force of the torque distributing clutch.

Figure 3:
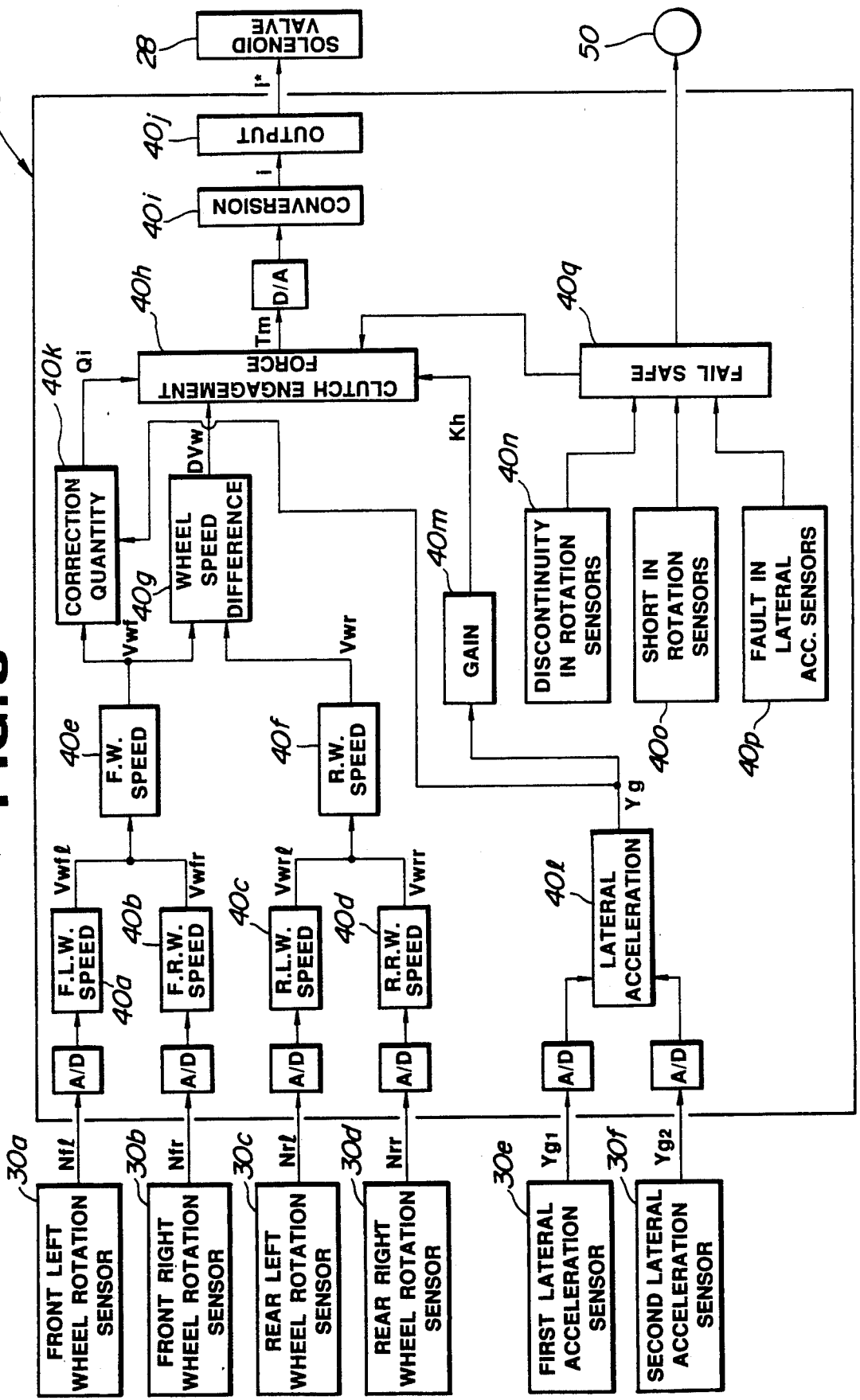
FIG. 3 is a block diagram showing a control unit of the embodiment shown in FIG. 2.

As shown in FIG. 3, the sensor group 30 of this embodiment includes a front left wheel rotation sensor 30a for sensing the number of revolutions Nfl of the front left wheel 10, a front right wheel rotation sensor 30b for sensing the number of revolutions Nfr of the front right wheel 10, a rear left wheel rotation sensor 30c for sensing the number of revolutions Nrl of the rear left wheel 6, a rear right wheel rotation sensor 30d for sensing the number of revolutions Nrr of the rear right wheel 6, a first lateral acceleration sensor 30e, and a second lateral acceleration sensor 30f.

The torque split control unit 40 includes a circuit 40a for receiving the signal of the front left wheel rotation sensor 30a and determining a front left wheel speed Vwfl, a circuit 40b for receiving the signal of the front right wheel rotation sensor 30b and determining a front right wheel speed Vwfr, a circuit 40c for receiving the signal of the rear left wheel rotation sensor 30c and determining a rear left wheel speed Vwrl, and a circuit 40d for receiving the signal of the rear right wheel rotation sensor 30d and determining a rear right wheel speed Vwrr. The torque split control unit 40 further includes a circuit 40e connected with the circuits 40a and 40b, for determining a front wheel speed Vwf, a circuit 40f connected with the circuits 40c and 40d, for determining a rear wheel speed Vwr, and a circuit 40g connected with the circuits 40e and 40f, for determining a measured front and rear wheel speed difference DVw. The front wheel speed Vwf is an average (arithmetic mean) of Vwfl and Vwfr, and the rear wheel speed Vwr is an average (arithmetic mean) of Vwrl and Vwrr. In this embodiment, the measured front and rear wheel speed difference DVw is a difference obtained by subtracting the front wheel speed Vwf (i.e. a secondary wheel speed) from the rear wheel speed Vwr (i.e. a primary wheel speed).

The torque split control unit 40 of this embodiment further includes a circuit 40h for computing a desired clutch engagement force Tm, a Tm-i converting circuit 40i for converting the output signal of the circuit 40h to a current signal i, an output circuit 40j for outputting the dither current i*, a circuit 40k for determining a correction quantity Qi, a circuit 40l for determining a lateral acceleration Yg of the vehicle by using an output signal Yg1 of the first lateral acceleration sensor 30e and an output signal Yg2 of the second lateral acceleration sensor 30f, a circuit 40m for determining a gain Kh in accordance with the lateral acceleration Yg, a circuit 40n for detecting an abnormal condition such as a broken connection which breaks the continuity of each rotation sensor, a circuit 40o for detecting a short-circuit of each rotation sensor, a circuit 40p for detecting an abnormal condition in the lateral acceleration sensors, and a fail-safe circuit 40q. The control unit 40 further includes analog-to-digital converters A/D and a digital-to-analog converter D/A. The fail-safe circuit 40q is connected with a warning lamp 50.

Figure 4:
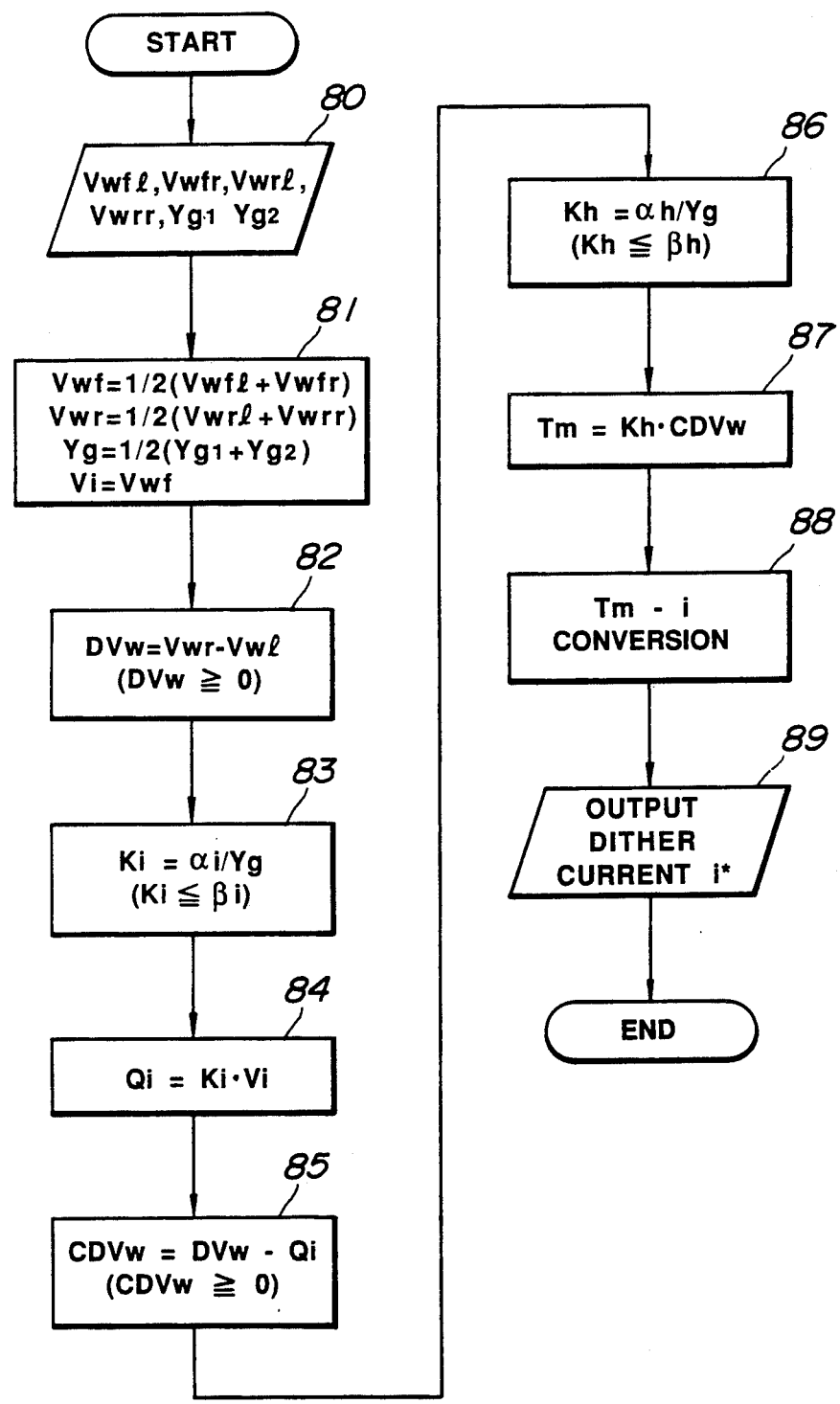
FIG. 4 is a flow chart showing a control procedure performed by the control unit of the embodiment.

The torque split control unit 40 of this embodiment controls the driving force distribution according to a control procedure shown in FIG. 4.

At a step 80, the control unit 40 reads the front left wheel speed Vwfl, the front right wheel speed Vwfr, the rear left wheel speed Vwrl, the rear right wheel speed Vwrr, the first lateral acceleration Yg1, and the second lateral acceleration Yg2.

At a step 81, the control unit 40 determines the front wheel speed Vwf, the rear wheel speed Vwr, the lateral acceleration Yg and the vehicle speed Vi. In this embodiment, the front wheel speed Vwf is the average of the front left and front right wheel speeds Vwfl and Vwfr, the rear wheel speed Vwr is the average of the rear left and rear right wheel speeds Vwrl and Vwrr, and the lateral acceleration Yg is the average of the first and second lateral accelerations Yg1 and Yg2. In this embodiment, the vehicle speed Vi is set equal to the front wheel speed Vwf.

At a step 82, the control unit 40 determines the measured wheel speed difference DVw which is a difference obtained by subtracting the front wheel speed Vwf (that is, the secondary wheel speed) from the rear wheel speed Vwr (that is the primary wheel speed).

At a step 83, the control unit 40 determines a proportionality factor (or proportionality constant) Ki in accordance with the reciprocal of the lateral acceleration Yg. In this embodiment, the proportionality factor Ki is inversely proportional to the lateral acceleration Yg, and determined by using the following equation.

$$Ki = \alpha i / Yg \text{ (provided that } Ki \leq \beta i)$$

For example, $\alpha i = 0.001$ and $\beta i = 0.01$.

At a step 84, the control unit 40 determines the correction quantity Qi by using the proportionality factor Ki and the vehicle speed Vi. In this embodiment, the correction quantity Qi is proportional to the vehicle speed, and determined by the following equation.

$$Qi = Ki \times Vi$$

Figure 6:
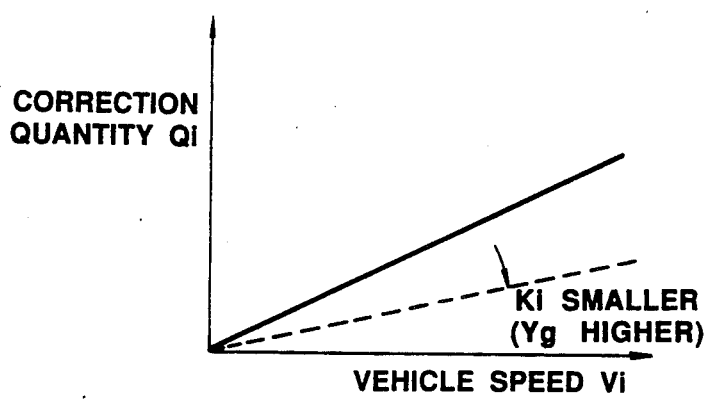
FIG. 6 is a graph showing a characteristic of a correction quantity with respect to a vehicle speed, which is employed in the embodiment.

FIG. 6 shows a relationship between the correction quantity Qi and the vehicle speed Vi, employed in this embodiment. The correction quantity Qi increases as the vehicle speed increases, and the rate of increase of the correction quantity is decreased as the lateral acceleration Yg increases.

At a step 85, the control unit 40 determines the corrected wheel speed difference CDVw which is a difference resulting from subtraction of the correction quantity Qi from the measured wheel speed difference DVw. That is, $$CDVw = DVw - Qi$$

At a step 86, the control unit 40 determines a control gain Kh in accordance with the reciprocal of the lateral acceleration Yg. In this embodiment, the control gain Kh is inversely proportional to the lateral acceleration Yg, and determined by using the following equation.

$$Kh = \alpha h / Yg \text{ (provided that } Kh \leq \beta h)$$

For example, $\alpha h = 1$ and $\beta h = 10$.

At a step 87, the control unit 40 determines the desired clutch engagement force Tm by using the control gain Kh and the corrected wheel speed difference CDVw. In this embodiment, the desired clutch engagement force Tm is determined by multiplying the corrected wheel speed difference CDVw by the control gain Kh. That is, $$Tm = Kh \times CDVw$$

Figure 5:
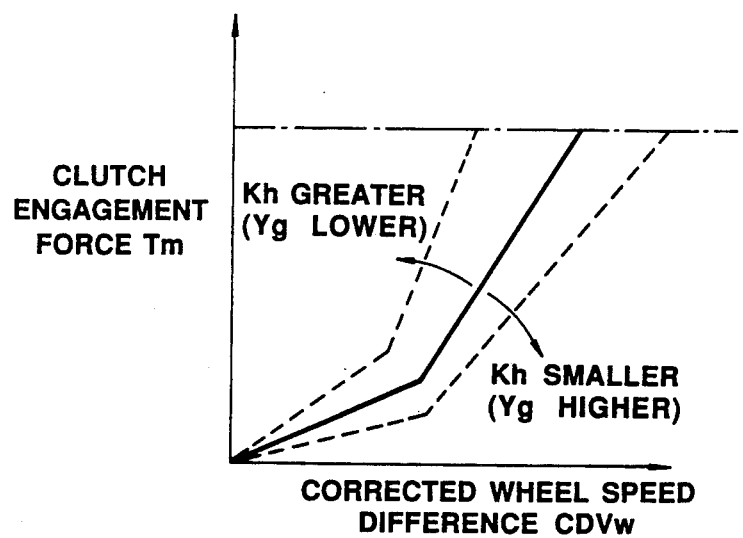
FIG. 5 is a graph showing a characteristic of a desired clutch engagement force which can be used in the embodiment.

However, it is possible to employ a control characteristic shown in FIG. 5.

The control unit 40 of this embodiment holds the desired clutch engagement force equal to zero when the measured wheel speed difference DVw is negative, and when the corrected wheel speed difference CDVw is negative. However, it is possible to increase the clutch engagement force as the absolute value of the measured wheel speed difference increases or to control the clutch engagement force in any known manner in the negative range in which the measured wheel speed difference is smaller than zero. In this situation, the control unit 40 comprises a fourth processing means for calculating the desired clutch engagement force in the negative range in which the measured wheel speed difference is less than zero.

At a step 88, the control unit 40 converts the signal representing Tm determined at the step 87, into the solenoid drive current i by using a predetermined Tm-i characteristic table.

At a step 89, the control unit 40 delivers the dither current i* (for example, i±0.1A, 100 Hz), to the solenoid valve 28.

Figure 7:
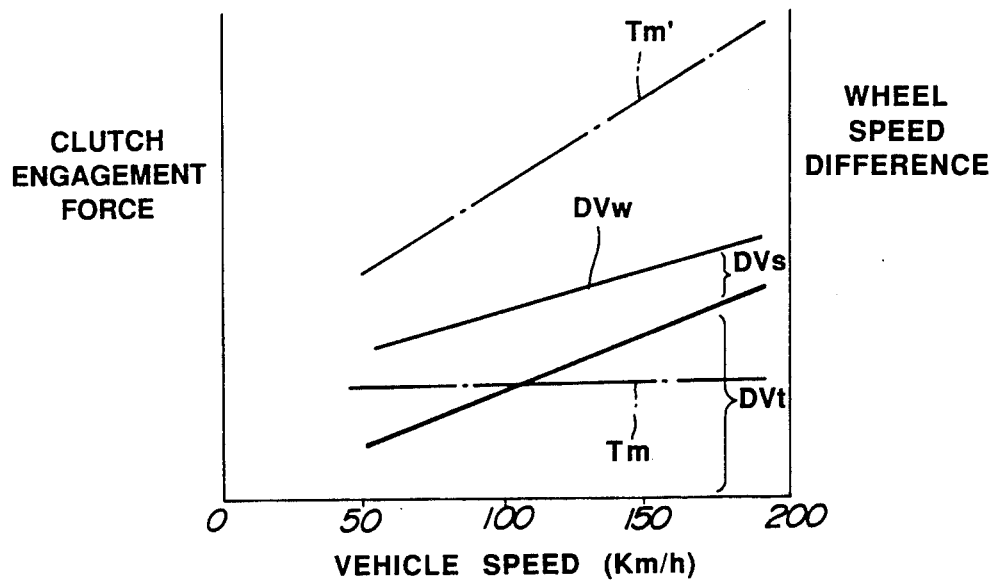
FIG. 7 is a graph of relationships of the desired clutch engagement force and wheel speed difference versus the vehicle speed, for illustrating the operations of the control system of the embodiment.
Figure 8:
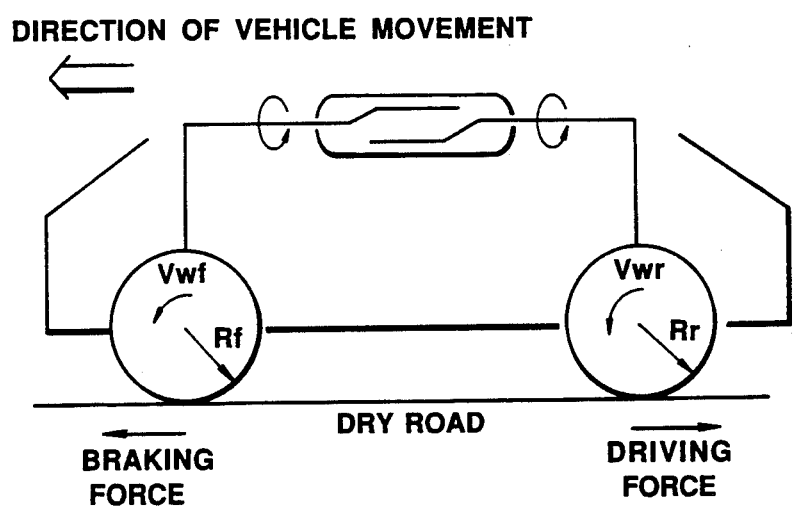
FIG. 8 is a schematic view of a 4WD vehicle for illustrating influences of a tire diameter difference between the front and rear wheels.

The control system of this embodiment is operated as follows:

When the vehicle is moving straight ahead on a road surface of a low friction coefficient, or the vehicle is accelerated during straight ahead operation, there is arises an increase in the measured wheel speed difference DVw, which contains a front and rear wheel speed difference DVs due to drive wheel slip, and a front and rear wheel speed difference DVt due to tire diameter difference between the front and rear wheels, as shown in FIG. 7. In the case of FIG. 7, the front tire diameter is slightly greater than the rear tire diameter. The wheel speed difference DVt due to tire diameter difference increases as the vehicle speed increases, as shown in FIG. 7.

In this case, the control system of the embodiment subtracts the correction quantity Qi increasing with the vehicle speed, from the measured wheel speed difference DVw, and employs, as the input to the controller element, the corrected wheel speed difference CDVw which is the result of the subtraction. The correction quantity Qi corresponds to the wheel speed difference DVt due to tire diameter difference, and the corrected wheel speed difference CDVw becomes approximately equal to the wheel speed difference DVs due to drive wheel slip. In this way, the control system of the invention increases the clutch engagement force of the torque distributing transfer clutch adequately in accordance with the drive wheel slip by increasing the magnitude of the control signal in accordance with the corrected wheel speed difference, and by so doing prevents an excess in the clutch engagement force due to the tire diameter difference between the front and rear wheels.

As shown by a line indicated by Tm in FIG. 7, the control system of the invention holds the clutch engagement force Tm relatively low even in a high vehicle speed range. Therefore, the control system of the invention can prevent unpleasant up-and-down vibrations and severe clutch slippage resulting in an increase in the temperature of the differential oil.

The unpleasant vibrations in the high vehicle speed range have been confirmed experimentally, and it is considered that these vibrations are caused not by fluctuation in the clutch engagement force, but by a resonance in the drive system which is produced by the forced connection through the slippingly engaged transfer clutch between the front and rear wheels rotating at different speeds because of the tire diameter difference.

In a cornering operation on a road surface of a high friction coefficient, there arises a front and rear wheel speed difference DVc due to a difference between the turning radius of the front wheels and the turning radius of the rear wheels, and the measured wheel speed difference DVw amounts to the sum of the wheel speed difference DVs due to the drive wheel slip, the wheel speed difference DVt due to the tire diameter difference, and the wheel speed difference DVc due to the turning radius difference, so that it is not possible to accurately detect the wheel speed difference DVt due to the tire diameter difference. Therefore, the control system of the embodiment determines the correction quantity Qi by multiplying the vehicle speed Vi by the proportionality factor Ki which decreases as the lateral acceleration Yg increases, and thereby decreases the correction quantity Qi as the lateral acceleration Yg increases. A vehicle body roll during cornering weakens the feeling to vibrations, so that the up-and-down vibrations are not so annoying, and the cornering operation does not continue a long time, so that the temperature of the differential oil is not increased too much. Accordingly, the control system of this embodiment decreases the correction quantity Qi with an increase of the lateral acceleration Yg, as shown in FIG. 6, and thereby refrains from correcting the measured wheel speed difference during a cornering operation.

Furthermore, the control system of the embodiment efficiently prevents the undesired effect of tight corner braking on a high friction coefficient road by decreasing the control gain Kh with increase in the lateral acceleration, and minimizes the drive wheel slip on a low friction coefficient road by increasing the control gain Kh with decrease in the lateral acceleration.

The present invention is also applicable to a 4WD vehicle in which the front wheels are the primary drive wheels, and the rear wheels are the secondary drive wheels.

In the illustrated embodiment, the control unit 40 serves as a first processing means for determining the correction quantity Qi, a second processing means for determining the corrected wheel speed difference CDVw, and a third processing means for determining the desired clutch engagement force Tm. As described above, the control unit 40 of the illustrated embodiment holds the desired clutch engagement force equal to zero when the corrected wheel speed difference CDVw us negative. Consequently, the desired clutch engagement force is fixed at zero when the measured wheel speed difference is smaller than the correction quantity. When the control unit 40 comprises the above-described fourth processing means for controlling the clutch engagement force in the negative range in which the measured wheel speed difference is less than zero, and this fourth means makes the desired clutch engagement force greater than zero in the negative range, then the desired clutch engagement force is held equal to zero only in the range in which the measured wheel speed difference is greater than or equal to zero and less than or equal to the correction quantity. Consequently, this range between a lower limit at which the measured wheel speed difference is zero and an upper limit at which the measured wheel speed difference is equal to the correction quantity can be regarded as a dead band over which the measured signal representing the measured wheel speed difference can be varied without initiating a response. The correction quantity of the invention is thus equal to the width of this dead band.

The third processing means serves as a basic processing means which receives the corrected wheel speed difference as an input and generates the desired clutch engagement force as an output. The output of the basic processing means is a predetermined function of the input as expressed by the mathematical relationship in step 87 of FIG. 4, or the mathematical relationship shown in FIG. 5. In the case of the relationship shown in FIG. 5, the desired clutch engagement force Tm is equal to a product of a first coefficient and the corrected wheel speed difference CDVw when the corrected wheel speed difference is less than a predetermined reference wheel speed difference. In the characteristic line shown in FIG. 5, the first coefficient is equal to the slope of the first inclined straight line segment extending from the origin of the graph, and a second coefficient is equal to the slope of the second inclined straight line segment which is steeper than the first line segment.

What is claimed is:

1. A driving force distribution control system for a vehicle, said driving force distribution control system comprising:
   a torque distributing unit including a primary drive means for transmitting a driving force from an engine of said vehicle to primary drive wheels of said vehicle, and a secondary drive means for transmitting a driving force from said engine to secondary drive wheels of said vehicle through a torque distributing clutch capable of varying driving force transmitted to said secondary drive wheels in response to a control signal;
   a first sensing means for determining a measured wheel speed difference between a primary wheel speed of said primary drive wheels and a secondary wheel speed of said secondary drive wheels;
   a second sensing means for determining a vehicle speed of said vehicle;
   a first processing means for determining a correction quantity in accordance with said vehicle speed;
   a second processing means for determining a corrected wheel speed difference which is a difference resulting from subtraction of said correction quantity from said measured wheel speed difference; and
   a third processing means for determining a desired clutch engagement force in accordance with said corrected wheel speed difference, and for producing said control signal representing said clutch engagement force, said third processing means holding said desired clutch engagement force equal to zero when said measured wheel speed difference is less than said correction quantity.

2. A driving force distribution control system according to claim 1 wherein said first processing means includes a means for increasing said correction quantity as said vehicle speed increases and said third processing means includes a means for increasing said desired clutch engagement force as said corrected wheel speed difference increases.

3. A driving force distribution control system for a vehicle, said driving force distribution control system comprising:
   a torque distributing unit including a primary drive means for transmitting a driving force from an engine of said vehicle to primary drive wheels of said vehicle, and a secondary drive means for transmitting driving force from said engine to secondary drive wheels of said vehicle through a torque distributing clutch capable of varying driving force transmitted to said secondary drive wheels in response to a control signal;

a first sensing means for determining a measured wheel speed difference between a primary wheel speed of said primary drive wheels and a secondary wheel speed of said secondary drive wheels;

a second sensing means for determining a vehicle speed of said vehicle;

a first processing means for determining a correction quantity in accordance with said vehicle speed;

a second processing means for determining a corrected wheel speed difference which is a difference resulting from subtraction of said correction quantity from said measured wheel speed difference; and a third processing means for determining a desired clutch engagement force in accordance with said corrected wheel speed difference, and for producing said control signal representing said clutch engagement force, wherein said first processing means includes a means for increasing said correction quantity as said vehicle speed increases and said third processing means includes a means for increasing said desired clutch engagement force as said corrected wheel speed difference increases, and wherein said first processing means includes a means for increasing said correction quantity in proportion to said vehicle speed.

4. A driving force distribution control system according to claim 3 wherein said driving force distribution control system further comprises a third sensing means for determining a lateral acceleration of the vehicle, and said first processing means includes a means for determining said correction quantity by multiplying said vehicle speed by a factor which decreases as said lateral acceleration increases.

5. A driving force distribution control system according to claim 4 wherein said first processing means includes a means for determining said factor, which is inversely proportional to said lateral acceleration.

6. A driving force distribution control system according to claim 5 wherein said driving force distribution control system further comprises a control gain determining means for determining a control gain which decreases as said lateral acceleration increases, and said third processing means includes a means for determining said desired clutch engagement force by multiplying said corrected wheel speed difference by said control gain.

7. A driving force distribution control system according to claim 6 wherein said primary drive wheels are rear wheels of said vehicle, and said secondary drive wheels are front wheels of said vehicle.

8. A driving force distribution control system according to claim 1 wherein said third processing means includes a means for making said desired clutch engagement force equal to zero when said measured wheel speed difference is equal to said correction quantity, and for increasing said desired clutch engagement force from zero as said corrected wheel speed difference increases from zero.

9. A driving force distribution control system according to claim 1 wherein said third processing means increases said desired clutch engagement force such that said desired clutch engagement force is proportional to said corrected wheel speed difference, and such that said desired clutch engagement force is equal to zero when said corrected wheel speed difference is equal to zero.

10. A driving force distribution control system according to claim 1 wherein said third processing means included a means for holding said desired clutch engagement force equal to zero in a range in which said measured wheel speed difference is greater than or equal to zero and less than or equal to said correction quantity.

11. A driving force distribution control system according to claim 1 wherein said third processing means generates said desired clutch engagement force only when said measured wheel speed difference is greater than or equal to zero.

12. A driving force distribution control system according to claim 9 wherein said third processing means includes a means for increasing said desired clutch engagement force such that said desired clutch engagement force is equal to a product of a first coefficient and said corrected wheel speed difference when said corrected wheel speed difference is less than a predetermined reference wheel speed difference, and equal to a product of a second coefficient and said corrected wheel speed difference when said corrected wheel speed difference is greater than said predetermined reference wheel speed difference, said second coeffective being greater than said first coefficient.

13. A driving force distribution control system according to claim 11 wherein said driving force distribution control system further comprises a fourth processing means for determining said clutch engagement force when said measured wheel speed difference is less than zero.

14. A driving force distribution control system according to claim 12 wherein each wheel of said vehicle is equipped with a tire, and said first processing means includes a means for determining said correction quantity utilizing a wheel speed difference caused by a difference between a tire diameter of said primary drive wheels and a tire diameter of said secondary drive wheels.

15. A driving force distribution control system for a vehicle, said driving force distribution control system comprising:

a torque distributing unit including a primary drive means for transmitting a driving force from an engine of said vehicle to primary drive wheels of said vehicle, and a second drive means for transmitting driving force from said engine to secondary drive wheels of said vehicle through a torque distributing clutch capable of varying driving force transmitted to said secondary drive wheels in response to a control signal;

a first sensing means for sensing a primary wheel speed of said primary drive wheels and a secondary wheel speed of said secondary drive wheels, and for determining a measured wheel speed difference between said primary and secondary wheel speeds;

a second sensing means for determining a vehicle speed of said vehicle; and a controlling means for controlling an actual clutch engagement force of said torque distributing clutch in accordance with said measured wheel speed difference by generating said control signal such that said control signal represents a desired clutch engagement force, said controlling means including a basic processing means for receiving an input variable and for determining said desired clutch engagement force as a function of said input variable such that said desired clutch engagement force is equal to zero when said input variable is zero and such that said desired clutch engagement force increases from zero as said input variable increases from zero, said controlling means further including a dead band setting means for determining a correction quantity corresponding to a dead band in accordance with said vehicle speed, and for determining said input variable, which is a corrected wheel speed difference resulting from subtraction of said correction quantity from said measured wheel speed difference, said dead band setting means causing said basic processing means to make said desired clutch engagement force equal to zero when said measured wheel speed difference is equal to said correction quantity.

16. A driving force distribution control system according to claim 15 wherein said basic processing means holds said desired clutch engagement force equal to zero when said input variable is less than zero.

17. A driving force distribution control system according to claim 16 wherein said basic processing means includes a means for determining said desired clutch engagement force only in a range in which said measured wheel speed difference is greater than or equal to zero.

* * * * *